United States Patent
Dwelly et al.

(10) Patent No.: US 8,026,840 B2
(45) Date of Patent: Sep. 27, 2011

(54) BIOMETRIC RADAR SYSTEM AND METHOD FOR IDENTIFYING PERSONS AND POSITIONAL STATES OF PERSONS

(75) Inventors: Wesley H. Dwelly, Sahuarita, AZ (US); Vinh N. Adams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/261,875

(22) Filed: Oct. 28, 2005

(65) Prior Publication Data

US 2010/0321229 A1  Dec. 23, 2010

(51) Int. Cl.
G01S 13/10 (2006.01)
G01S 13/12 (2006.01)
G01S 13/18 (2006.01)
G06K 9/00 (2006.01)
G01S 13/00 (2006.01)

(52) U.S. Cl. ............... 342/28; 342/22; 342/27; 342/89; 342/90; 342/118; 342/134; 342/135; 342/137; 342/145; 342/175; 342/195; 382/100; 382/103; 382/115; 382/181; 382/224

(58) Field of Classification Search ............. 342/21, 342/22, 27, 28, 59, 82–103, 175, 192–197; 382/100, 103, 115–127, 181, 209–224
See application file for complete search history.

(56) References Cited

U.S. PATENT DOCUMENTS

| | | | |
|---|---|---|---|
| 3,696,417 A | 10/1972 | Pedersen | |
| 5,030,956 A * | 7/1991 | Murphy | 342/22 |
| 5,227,797 A * | 7/1993 | Murphy | 342/22 |
| 5,473,311 A * | 12/1995 | Hoseit | 342/27 |
| 5,504,487 A | 4/1996 | Tucker | |
| 5,612,700 A | 3/1997 | Tucker | |
| 5,774,088 A * | 6/1998 | Kreithen | 342/22 |
| 5,812,083 A | 9/1998 | Johnson et al. | |
| 5,949,367 A | 9/1999 | Trompf et al. | |
| 6,313,643 B1 * | 11/2001 | Tirkel et al. | 342/28 |
| 6,337,654 B1 | 1/2002 | Richardson et al. | |
| 6,437,728 B1 | 8/2002 | Richardson et al. | |

(Continued)

FOREIGN PATENT DOCUMENTS

WO  WO-2008091344 A1  7/2008

OTHER PUBLICATIONS

Yann LeCun, Leon Bottou, Yoshua Bengio, and Patrick Haffner; Gradient-Based Learning Applied to Document Recognition; Proceedings of the IEEE; Nov. 1998, pp. 1-46.

(Continued)

*Primary Examiner* — Bernarr E Gregory
(74) *Attorney, Agent, or Firm* — Schwegman, Lundberg & Woessner, P.A.; Gregory J. Gorrie (57) ABSTRACT

A biometric radar system and method for identifying a person's positional state are generally described herein. The biometric radar may phase adjust a sequence of radar return signals received through two or more receive antennas to remove at least some phase noise due to the stationary objects. The biometric radar may also segment the phase adjusted radar return signals into a plurality of multi-resolutional Doppler components. Each multi-resolutional Doppler component may be associated with one of a plurality of biometric features. The biometric radar system may also combine and weight the segmented radar returns for each biometric feature to generate weighted classifications for a feature extraction process.

33 Claims, 8 Drawing Sheets

BIOMETRIC RADAR

U.S. PATENT DOCUMENTS

| | | | |
|---|---|---|---|
| 6,507,309 B2 * | 1/2003 | McMakin et al. | 342/22 |
| 6,507,662 B1 * | 1/2003 | Brooks | 382/115 |
| 6,703,964 B2 * | 3/2004 | McMakin et al. | 342/22 |
| 6,898,299 B1 * | 5/2005 | Brooks | 382/115 |
| 6,943,724 B1 | 9/2005 | Brace et al. | |
| 7,031,857 B2 | 4/2006 | Tarassenko et al. | |
| 2002/0080360 A1 | 6/2002 | Bablumyan et al. | |
| 2002/0130804 A1 * | 9/2002 | McMakin et al. | 342/22 |
| 2003/0128150 A1 * | 7/2003 | McMakin et al. | 342/22 |
| 2005/0063566 A1 * | 3/2005 | Beek et al. | 382/115 |

OTHER PUBLICATIONS

"PCT Application No. PCT/US07/61000, International Search Report mailed Nov. 29, 2007", 2 pgs.

"PCT Application No. PCT/US07/61000, Written Opinion dated Nov. 29, 2007", 6 pgs.

Lecun, Y., et al., "Gradient-Based Learning Applied to Document Recognition", *Proceedings of the IEEE,* 86(11), (Nov. 1998), 1-46.

* cited by examiner

BIOMETRIC RADAR

MULTI – LAYERED NETWORKS

DISCRIMINATION OF ONE PERSON SITTING VS. ONE PERSON STANDING

Fig. 8

DISCRIMINATION OF ONE PERSON SITTING VS. TWO PEOPLE STANDING

Fig. 9

BIOMETRIC RADAR SYSTEM AND METHOD FOR IDENTIFYING PERSONS AND POSITIONAL STATES OF PERSONS

TECHNICAL FIELD

Embodiments of the present invention pertain to radar systems. Some embodiments relate to non-linear convolutional networks, and some embodiments relate to neural networks. Some embodiments of the present invention also relate to feature extraction and biometrics.

BACKGROUND

Many conventional radar systems have difficulty distinguishing slowly moving and non-moving objects from clutter. Conventional radar systems also have difficulty distinguishing persons from clutter and stationary objects even when the person is moving. Conventional radar systems also have difficulty identifying slowly moving and non-moving objects such as persons behind walls and other solid objects. These limitations of many conventional radar systems make it easy for a slow moving person to penetrate surveillance radar.

Thus, there are general needs for radar systems that can distinguish persons from non-persons. There are also general needs for radar systems that can determine whether a person is walking, sitting, standing, sleeping or performing some other action. There are also general needs for radar systems that can identify particular individuals.

SUMMARY

A biometric radar (100) includes phase adjusters (108) to phase adjust a sequence of radar return signals received through two or more receive antennas (102) to force coherency against stationary objects. The phase-adjusting removes at least some phase noise due to the stationary objects. The biometric radar also includes a signal processor (110) to segment the phase adjusted radar return signals into a plurality of multi-resolutional Doppler components. Each multi-resolutional Doppler component may be associated with one of a plurality of biometric features (122). The biometric radar system also includes a neural network (112) to combine and weight the segmented radar returns for each biometric feature to generate weighted classifications (115) for a feature extraction process. Biometric radar system (100) may identify a person from a non-person, and in some embodiments, may further determine what the person is doing, such as whether a person is walking, talking, standing, sitting, or sleeping.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
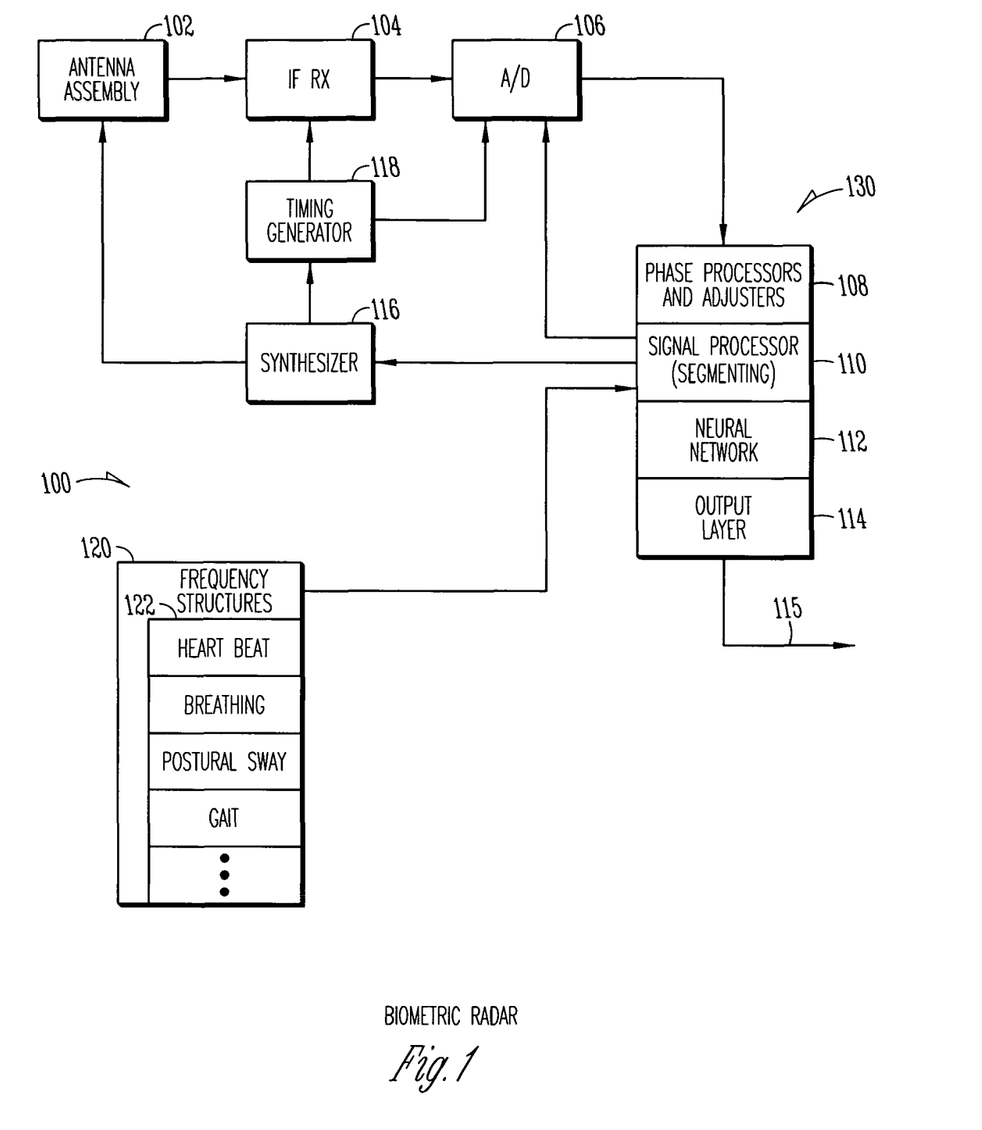
FIG. 1 is a block diagram of a biometric radar system 100 in accordance with some embodiments of the present invention.

FIG. 1 is a block diagram of a biometric radar system 100 in accordance with some embodiments of the present invention. Biometric radar system 100 includes antenna assembly 102 to transmit radar signals and receive radar return signals, intermediate-frequency (IF) receive (RX) circuitry 104 to downconvert the received radar return signals, and analog-to-digital (A/D) conversion circuitry 106 to sample and digitize the returns provided by IF RX circuitry 104. Biometric radar system 100 also include signal processing circuitry 130 to process the sampled radar returns and provide an output 115 which may identify whether or not a target is a human, and/or may identify a positional state of a person. This is discussed in more detail below.

Biometric radar system 100 may also include frequency synthesizer 116 for generating transmit waveforms for transmission by antenna assembly 102. Biometric radar system may also include timing generator 118 which generates timing signals and clock signals for the various elements of system 100.

In accordance with some embodiments of the present invention, signal processing circuitry 130 may include phase adjustors 108, signal processor 110 and neural network 112. Neural network 112 may include output layer 114, which may be a feature extractor discussed in more detail below. Output layer 114 is optional. In these embodiments, phase adjustors Phase adjusters 108 may phase adjust a sequence of radar return signals received through two or more receive antennas of antenna structure 102 to force coherency against stationary objects. The phase-adjusting may remove at least some phase noise due to the stationary objects (e.g., like walls). Signal processor 110 may segment the phase adjusted radar return signals into a plurality of multi-resolutional Doppler components. Each multi-resolutional Doppler component may be associated with one of a plurality of biometric features 122. Non-linear convolutional neural network 112 may combine and weight the segmented radar returns for each biometric feature to generate weighted classifications 115 for the feature extraction process.

In some embodiments, radar system 100 may identify a person from a non-person, and in some embodiments, radar system may further determine what the person is doing. For example, radar system 100 may determine whether a person is walking, talking, standing, sitting, or sleeping i.e., the person's positional state. In some embodiments, radar system 100 may determine whether the identified person is carrying an object and/or whether there are multiple persons. In some embodiments, radar system 100 may be able to identify specific individuals. These embodiments are discussed in more detail below.

In some embodiments, radar system 100 may perform a range scan of the environment and may lock one radar range gate on static objects, such a wall. The other radar range gates may be place on the target. In these embodiments, the radar range gate locked on the static objects may be used as a phase reference to force coherency for the system. In some embodiments, movement of the operator may also be removed allowing hand-held operation.

An example of phase adjusting and removal of phase noise to help force coherency suitable for use with some embodiments of the present invention is disclosed in U.S. Pat. No. 7,379,017, which incorporated herein by reference, although the scope of the invention is not limited in this respect. In some embodiments, a neural network configured to operate similarly to those disclosed by Yann LeCun et al in the article entitled "Gradient-Based Learning Applied to Document Recognition" Proc. of the IEEE, November 1998, may be suitable for use as neural network 112, although the scope of the invention is not limited in this respect.

In some embodiments, each multi-resolutional Doppler component may have a frequency structure 120 associated with one of biometric features 122. Biometric features 122 may be associated with humans and comprise heartbeat, breathing, postural sway and gait, although the scope of the invention is not limited in this respect.

In some embodiments, the neural network 112 processes the segmented and phase-adjusted radar return signals to identify a person from a non-person, although the scope of the invention is not limited in this respect. In some embodiments, weighted classifications 115 correspond to one or more positional states of a person including a person walking, a person talking, a person standing, a person sitting, a person sleeping, multiple persons, and a person with an object, although the scope of the invention is not limited in this respect. In these embodiments, radar system 100 may identify not only a person from non-human objects, but may identify the person's positional state.

In some embodiments, signal processor 110 further segments the phase-adjusted radar return signals into non-biometric features including static objects (e.g., walls) and clutter, although the scope of the invention is not limited in this respect. In some embodiments, signal processor 110 may perform a discrete Fourier transform DFT, such as a Fast Fourier transform FFT, as part of the segmentation to measure and identify predetermined frequency components of a particular biometric feature. In some of these embodiments, the segmentation may include using a matched filter to segment known responses e.g., particular frequency characteristics.

In some embodiments, signal processing circuitry 130 may also include phase processors to lock a radar range gate on static objects and place other radar range gates on target objects (e.g., a human) to help force coherency. The phase processors may be part of the phase adjusting operations performed by phase adjustors 108.

In some embodiments, further comprising output layer 114 may comprise a feature extractor and may perform a feature extraction process to generate output 115 selected from one of the positional states.

In some embodiments, signal processor 110 integrates the radar return signals over differing coherency times for the different of the multi-resolutional Doppler components of the plurality. In these embodiments, some of the multi-resolutional Doppler components have longer coherency times than other multi-resolutional Doppler components. For example, signal processor 110 may integrate the multi-resolutional Doppler components associated with the biometric features of heartbeat and breathing for longer coherency times and may integrate the multi-resolutional Doppler components associated with the biometric features of postural sway and gait for shorter coherency times, although the scope of the invention is not limited in this respect. In some embodiments, signal processor 110 may integrate the radar returns for coherency times as great as 20-40 seconds, for example, for detecting heartbeat and detecting breathing, while integration may be performed on the radar returns for as little as ⅓ of a second, for example, for detecting postural sway and gait. In some embodiments, the segmenting performed by signal processor 110 may generate structured packets for each multi-resolution Doppler component.

In some embodiments, non-linear convolutional neural network 112 is trained with a back-propagation learning process to set weights of the biometric features 122 associated with the positional states. The learning process is described in more detail below. In some embodiments, neural network 112 may comprise other types of artificial neural networks such as a support vector machine, although the scope of the invention is not limited in this respect. In these embodiments, the support vector machine may classify with as much margin as possible and may be more robust to changes in the environment providing less false classifications.

In some embodiments, neural network 112 comprises a combination of a plurality of non-linear convolutional networks. Each of the non-linear convolutional networks may be associated with one of weighted classifications 115 and may correspond to one of the positional states, although the scope of the invention is not limited in this respect. In these embodiments, signal processor 110 may direct the multi-resolution Doppler components (e.g., based on it's frequency structure) associated with particular biometric features 122 to one or more of the convolutional networks of the plurality based on the classifications 115. The combination of the convolutional networks may performs a multi-layer (i.e., multi-level) non-linear convolutional process on the directed multi-resolutional Doppler components using non-linear filters to generate weighted positional states for a human target. Examples of this process are described in more detail below.

In some embodiments, different patterns of segmented data may be processed and directed to the different convolutional networks. For example, a person sitting may have a heartbeat and breathing, while a person standing may also have postural sway, while a person walking would have a faster heartbeat, a certain velocity and a gait. For example, the multi-resolutional Doppler component associated with heartbeat and breathing may be directed to a convolutional network associated with a person sitting, the multi-resolutional Doppler components associated with heartbeat, breathing and postural sway may be directed to a convolutional network associated with a person standing, and the multi-resolutional Doppler components associated with heartbeat, breathing, gait and slow velocity may be directed to a convolutional network associated with a person walking.

Figure 4:
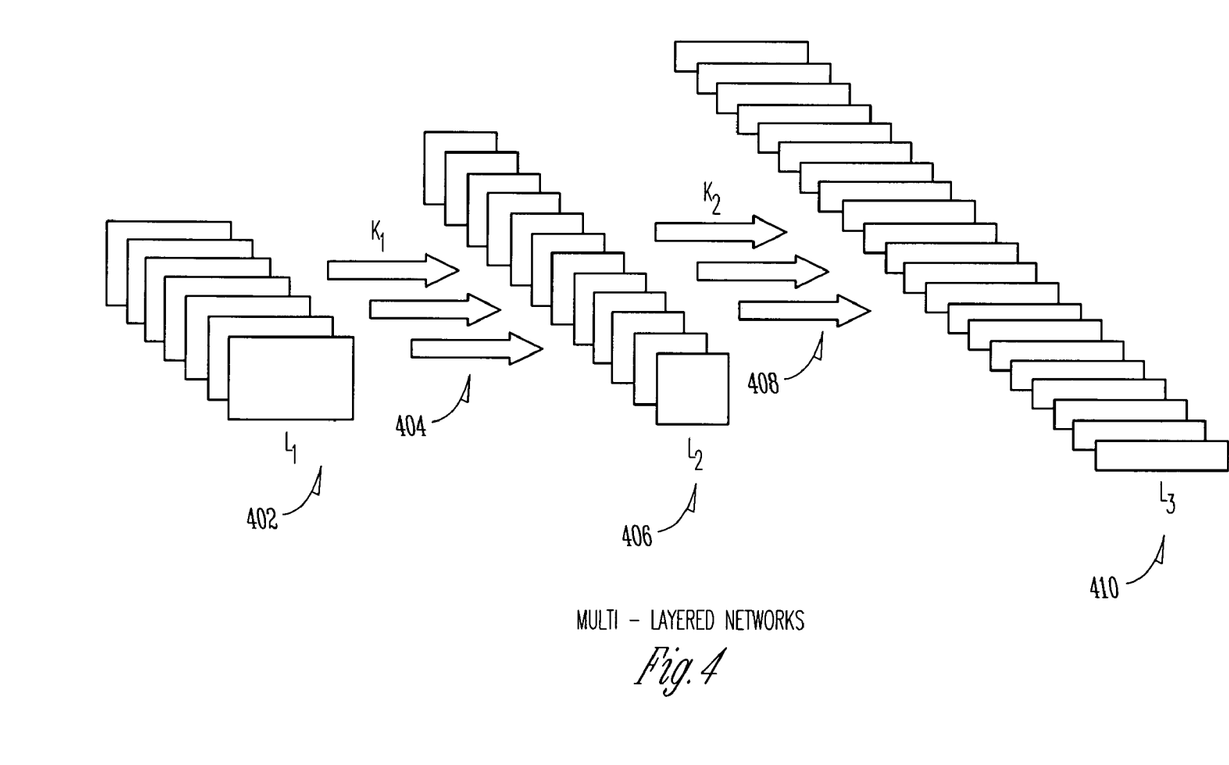
FIG. 4 illustrates the operation of a three layer non-linear convolutional network in accordance with some embodiments of the present invention.

In some embodiments, the non-linear convolutional networks of the plurality are configured to operate in parallel and are weighted to the quantity and quality of information in the multi-resolutional Doppler components (e.g., structured packets). FIG. 4, described in more detail below, illustrates three layers (e.g., $L_1$, $L_2$ and $L_3$) of parallel convolutional networks.

In some embodiments, neural network 112 may be further trained with the back-propagation learning process to set weights of biometric features 122 associated with a particular individual. Accordingly, particular individuals may be identified by system 100 based on their individual biometric features, such as their unique body features including their individual gait, postural sway, heartbeat and breathing, the combination being unique to an individual, although the scope of the invention is not limited in this respect. In these embodiments, one of the convolutional networks of the plurality may be associated that particular individual. In this way, radar system 100 may be trained to recognize persons from non-persons, as well as trained to recognize a person's positional state. In some embodiments, radar system 100 may be trained to further recognize an increased heart rate and associate the increased heart rate with an object (e.g., a weapon) to identify a threat. For example, radar system 100 may be training to recognize a person wearing an improvised explosive device vest (IED Vest) in front of or behind walls by the radar signature cause by the metal around the person's chest area. In another example, radar system 100 may be trained to recognize persons carrying rifles behind a wall from the unique radar signature resulting from the swaying guns.

In some embodiments, antenna structure 102 may have a transmit antenna and two or more receive antennas. The two or more receive antennas may receive the sequence of radar return signals in at least both azimuth and elevation, although the scope of the invention is not limited in this respect. Radar transmitter 100 may also include frequency synthesizer 116 to generate waveforms for transmission by the transmit antennas. The transmitted signals may include a series of short pulses stepped in frequency and corresponding to the received sequence of radar return signals. In some embodiments, the short pulses may have a frequency ranging between 3 and 6 GHz, a bandwidth of approximately 125 MHz, and a length of about 8 nanoseconds (nsec), although the scope of the invention is not limited in this respect. In some embodiments, the radar system disclosed in U.S. Pat. No. 7,142,153 and incorporated herein by reference may be suitable for portions of radar system 100, although the scope of the invention is not limited in this respect. In some embodiments, radar system 100 may be able to see a target, such as a person) through or around objects based on the selection of the frequency range and the selection of the characteristics of the series of short pulses that are stepped in frequency. In these embodiments, a person and/or a person's positional state may be identified behind opaque objects and within buildings.

Although radar system 100 is illustrated as having several separate functional elements, one or more of the functional elements may be combined and may be implemented by combinations of software-configured elements, such as processing elements including digital signal processors (DSPs), and/or other hardware elements. For example, some elements, such as signal processing circuitry 130, may comprise one or more microprocessors, DSPs, application specific integrated circuits (ASICs), and combinations of various hardware and logic circuitry for performing at least the functions described herein. In some embodiments, the functional elements of radar system 100 may refer to one or more processes operating on one or more processing elements. In some embodiments, frequency structures 110 and classifications 115 may be stored in a system memory.

Figure 2:
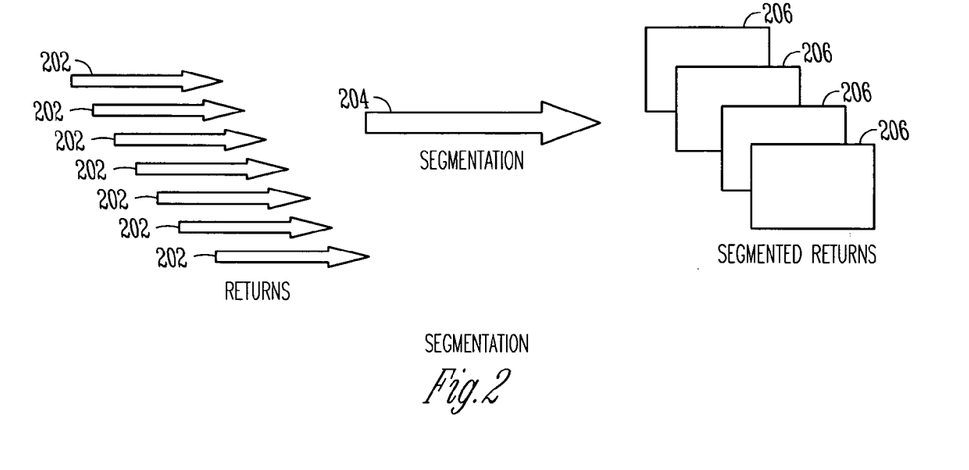
FIG. 2 illustrates the segmentation of radar return signals in accordance with some embodiments of the present invention.

FIG. 2 illustrates the segmentation of radar return signals in accordance with some embodiments of the present invention. In some embodiments, returns 202 may be digitized and provided by A/D converter 106 (FIG. 1), and signal processor 110 (FIG. 1) may perform a segmentation algorithm 204 on returns 202 to generate segmented returns 206. As discussed above, each segmented return 206 may have a frequency structure associated with a particular biometric feature. In some embodiments, segmentation algorithm 204 may generate structured packets of information from the sequence of radar returns provided by the front-end of radar system 100 (FIG. 1). In some embodiments, the structure packets may be generated to include information for fast Doppler, micro Doppler, radar-cross section (RCS), and polarization as well as the biometric features discussed above. Segmented returns 206 may be provided to neural network 112 (FIG. 1).

Figure 3:
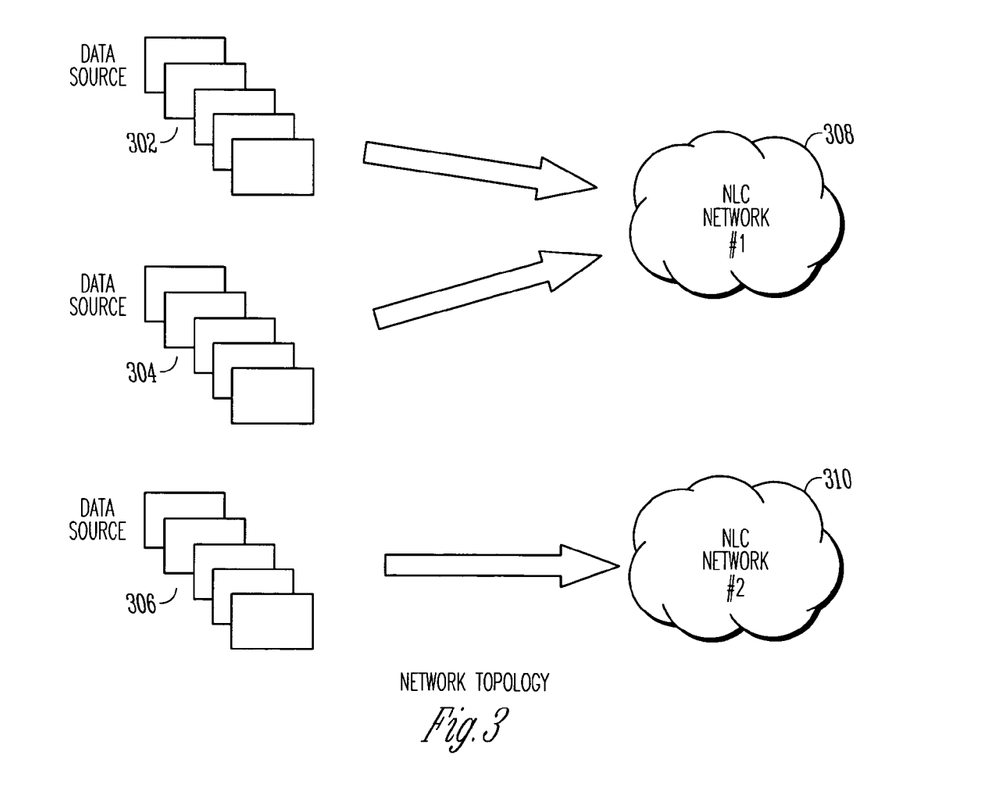
FIG. 3 illustrates the combining of data from the segmented radar returns for different convolutional networks in accordance with some embodiments of the present invention.

FIG. 3 illustrates the combining of data from the segmented radar returns for different convolutional networks in accordance with some embodiments of the present invention. In accordance with some embodiments, different patterns of segmented data may be processed and directed to different combinations of parallel non-linear convolutional networks. As discussed above, neural network 112 (FIG. 1) may comprise a combination of non-linear convolutional (NLC) networks. In the example illustrated in FIG. 3, data from data source 302 may be combined and weighted with data from data source 304 for a first non-linear convolutional (NLC) network 308, while data from data source 306 is not combined with other data and provided to a second non-linear convolutional network 310. In this simplified illustration, data source 302 may comprise the segmented returns associated with a heartbeat biometric feature, data source 304 may comprise the segmented returns associated with a breathing biometric feature, and network 308 may have been trained to identify persons from non-persons because a person generally has a heartbeat and is breathing.

In accordance with some embodiments, the segmented data may be directed to one or more non-linear convolutional networks. Furthermore, more than one non-linear convolutional network may be used for different detection tasks. In these embodiments, the processes performed in parallel by the non-linear convolutional networks may automatically determine the best features to discriminate biometrics based on the quantity and quality of the returns. In some embodiments, a-prior information is used to determine the combinations of the convolutional networks for particular biometric features.

FIG. 4 illustrates the operation of a three layer non-linear convolutional network in accordance with some embodiments of the present invention. As discussed above, in some embodiments, parallel non-linear convolutional networks may operate in a series of layers. Each of the parallel networks may be weighted based on the quality and quantity of information in the segmented radar returns. FIG. 4 illustrates the processing operations that may be performed by some parallel non-linear convolutional networks of neural network 112 (FIG. 1). In layer 1 ($L_1$), input data to each of the parallel non-linear convolutional networks 402 may be weighted and combined and then processed by first layer non-linear filters 404 ($K_1$). In layer 2 ($L_2$), parallel non-linear convolutional networks 406 may further weight and combine the data from the first layer of processing for subsequent non-linear filtering by a second layer non-linear filters 408 ($K_2$). In layer 3, parallel non-linear convolutional networks 410 may further weight and combine the data from the second layer of processing. Many additional layers of processing may be performed. In some embodiments, the data from the final layer may be processed with a final layer of non-linear filters to satisfy a particular output condition. For example, an output condition such as a person sitting or a person standing may be based on weighted sums determined in a training process described in more detail below.

In some embodiments, neural network 112 (FIG. 1) may be trained with collected data for many known conditions. The known conditions may include the positional states of one or more persons. The known conditions may also include static elements (non-persons) and other clutter. The weights may be adjusted by a back propagation process that provides the desired output. Several iterations of training data may result in an optimization of the convolutional weights for the desired outputs (e.g., the actual positional state).

Figure 5:
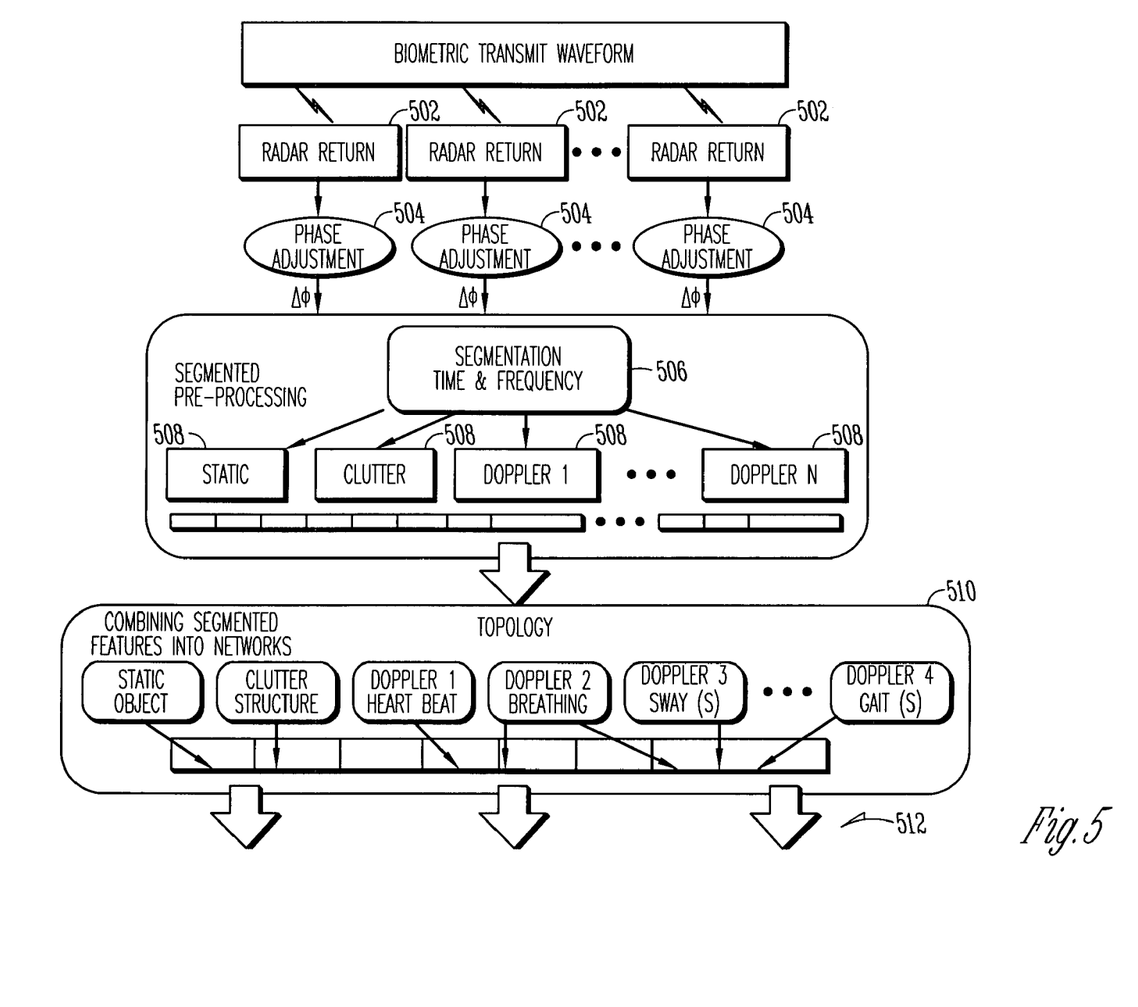
FIG. 5 illustrates the processing operations performed by a biometric radar system in accordance with some embodiments of the present invention.

FIG. 5 illustrates the processing operations performed by a biometric radar system in accordance with some embodiments of the present invention. As illustrated in FIG. 5, radar return signals 502 collected by the different receive antennas are phased adjusted in operations 504 to improve sub-clutter visibility as described above. Phase processors and phase adjustors 108 (FIG. 1) may perform these operations. The phase corrected returns may be pre-processed in both time and frequency and segmented in operations 506 into multi-resolutional Doppler components 508. Each segmented component 508 may be chosen for its ability to show different types of biometric features. During training, the algorithms performed by the non-linear convolutional networks may determine the actual features that are likely to be exposed. For example, breathing may include slow Doppler components while walking may include high-Doppler components. The combining and segmenting the features by the convolutional networks in operations 510 may generate outputs 512 which may be provided to output layer 114 (FIG. 1).

Figure 6A:
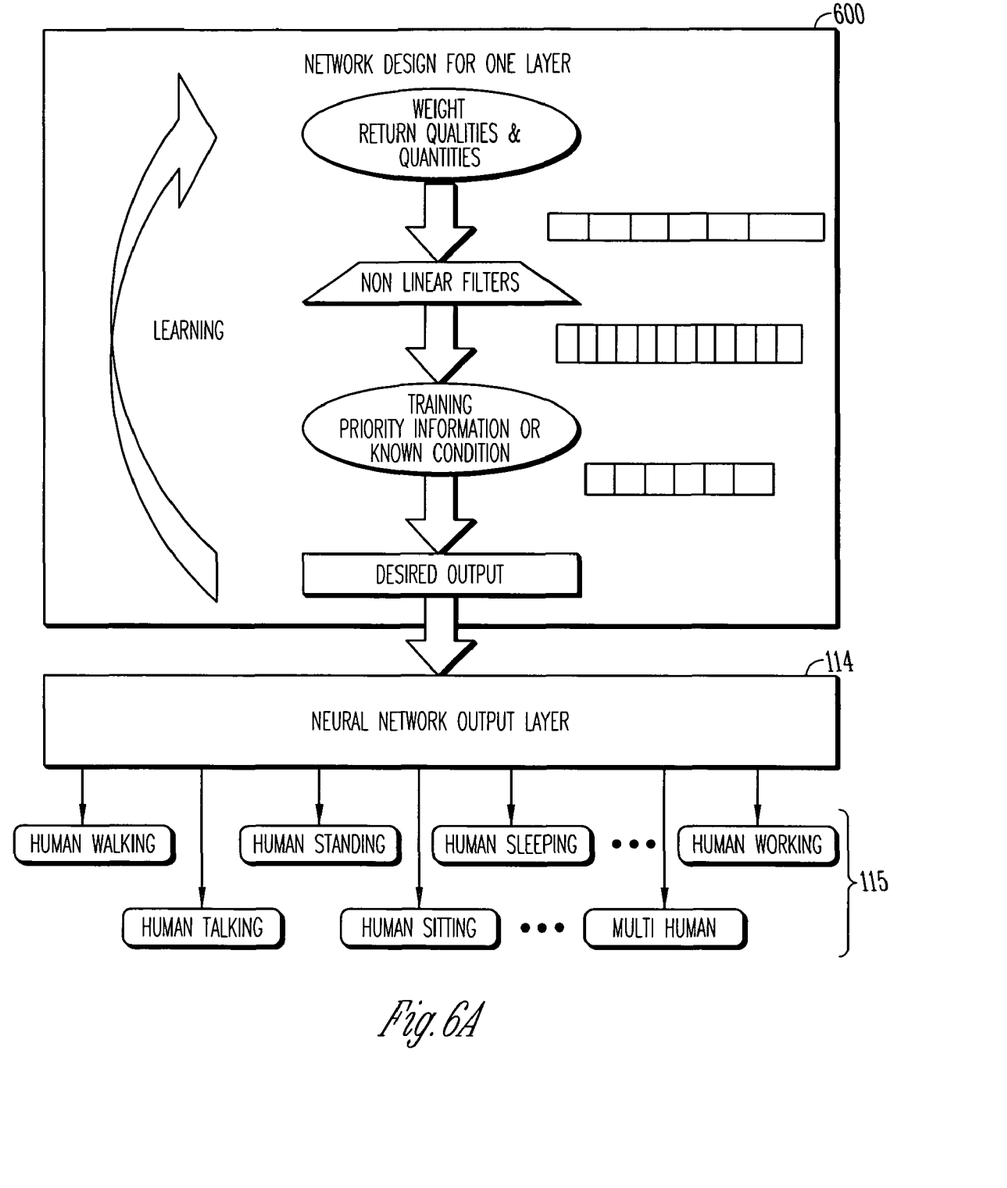
FIG. 6A illustrates the operation of one layer of a non-linear convolutional network in accordance with some embodiments of the present invention.

FIG. 6A illustrates the operation of one layer of a non-linear convolutional network in accordance with some embodiments of the present invention. Layer 600 may correspond to one layer of neural network 112 (FIG. 1). As illustrated, known outcomes are back-propagated through the layers in the direction toward the desired outcome. In some embodiments, the weights that result after training may provide information on the amount of information each parameter may have contributed to the outcome. For example, if polarization only contributed to a couple of the biometric outputs, system 100 may be designed to eliminate its use of polarization data reducing cost.

Once the training data is segmented, the topology may be designed by combining multiple structures into the multi-layer convolutional networks. For example, breathing and heartbeat components may be combined in a network for a person sitting. The network design may be completed by adding non-linear filters with weights, which may be selected through the learning or training process, illustrated in FIG. 6A for one layer.

Figures 6B, 6C:
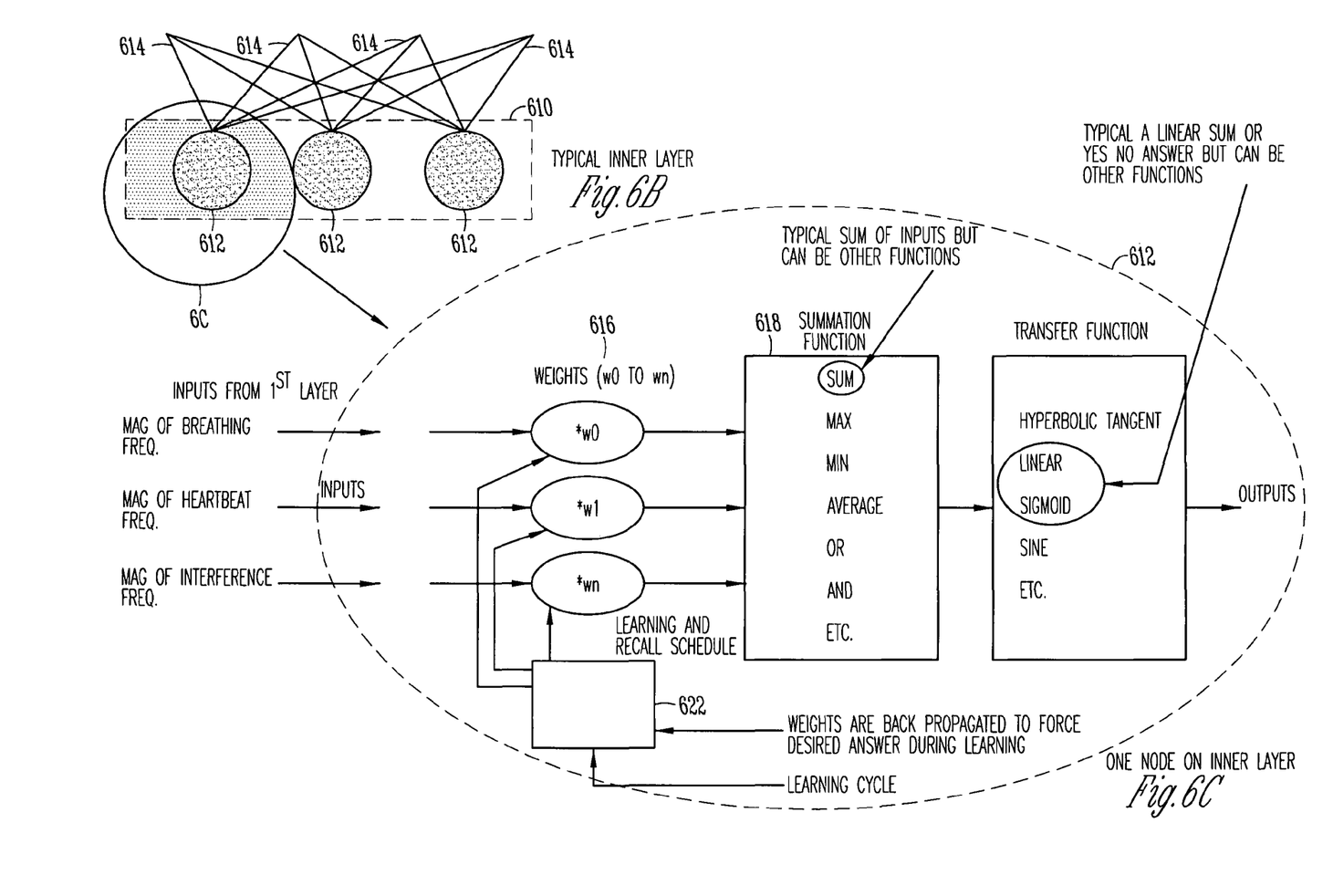
FIGS. 6B and 6C illustrate the operation of one node of an inner layer of a non-linear convolutional network in accordance with some embodiments of the present invention.

FIGS. 6B and 6C illustrate the operation of one node of an inner layer of a non-linear convolutional network in accordance with some embodiments of the present invention. FIG. 6B illustrates layer 610 of nodes 612 receiving inputs 614 from one or more data sources which may correspond to the segmented radar return data. FIG. 6C illustrates the weighting 616, the combining 618 and the application of a transfer function 620 by a node 612, as well as learning 622.

Figure 7:
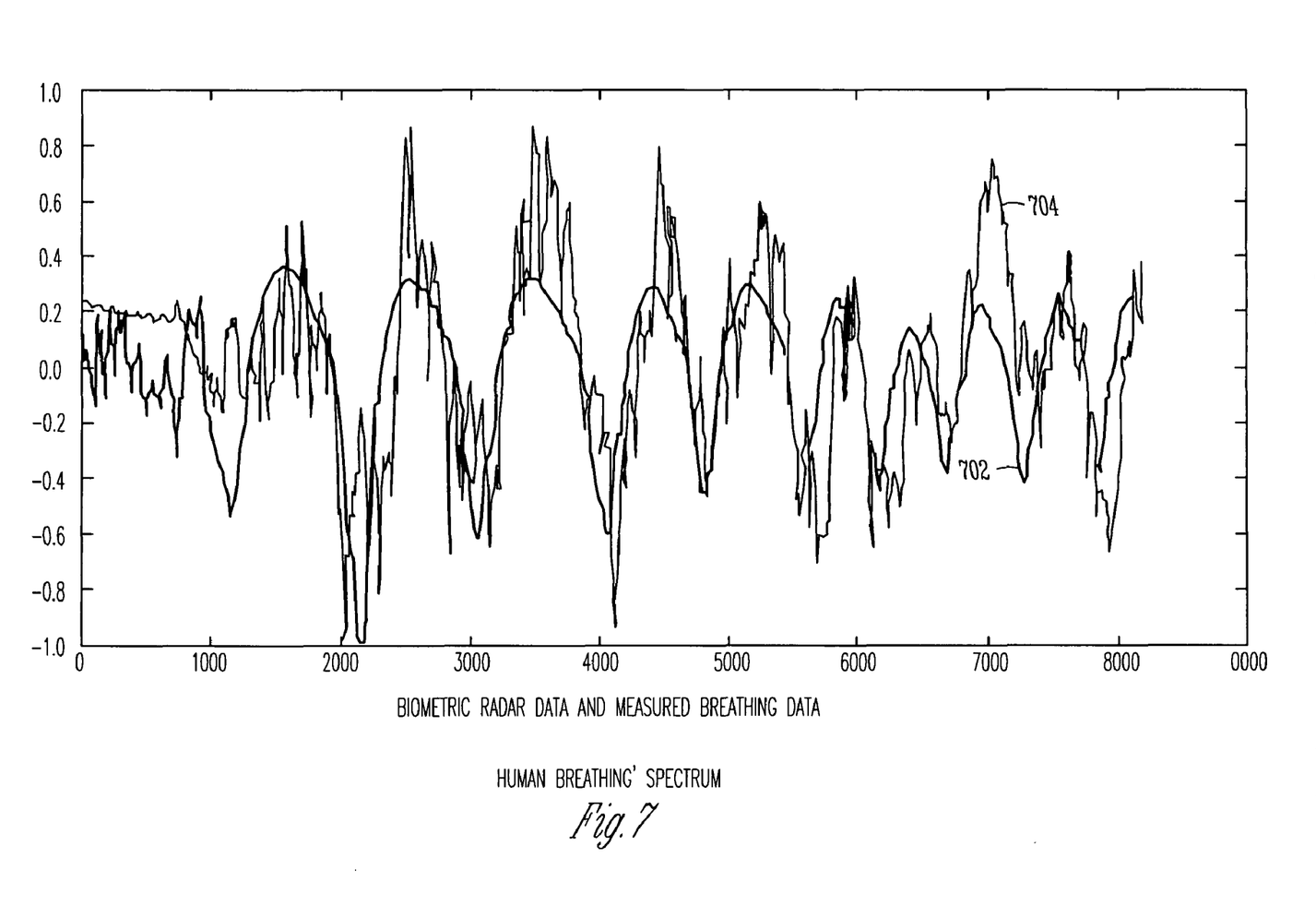
FIG. 7 illustrates the extraction and discrimination of human breathing in a heavy clutter environment performed by a biometric radar system in accordance with embodiments of the present invention.

FIG. 7 illustrates the extraction and discrimination of human breathing in a heavy clutter environment performed by a biometric radar system in accordance with embodiments of the present invention. Line 702 corresponds to test data for a human sitting and breathing, and line 704 corresponds to measured data. As can be seen, the features associated with a human breathing can be extracted in a heavy clutter environment using radar system 100 (FIG. 1).

Figure 8:
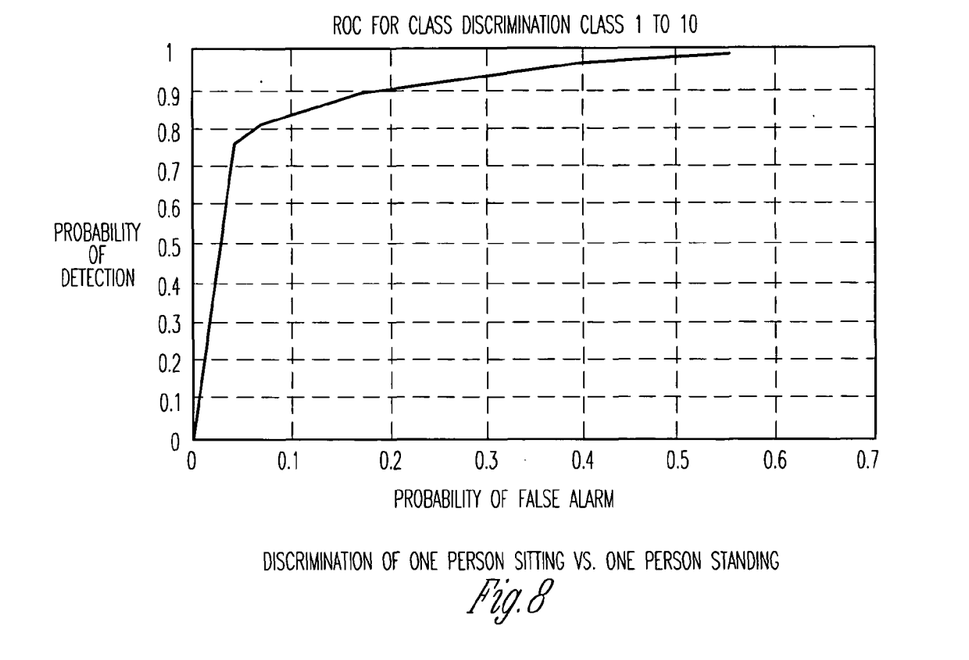
FIG. 8 illustrates discrimination between a person sitting and a person standing performed by a biometric radar system in accordance with embodiments of the present invention.

FIG. 8 illustrates discrimination between a person sitting and a person standing performed by a biometric radar system in accordance with embodiments of the present invention. As can be seen, a person sitting can easily be discriminated from a person standing using radar system 100 (FIG. 1).

Figure 9:
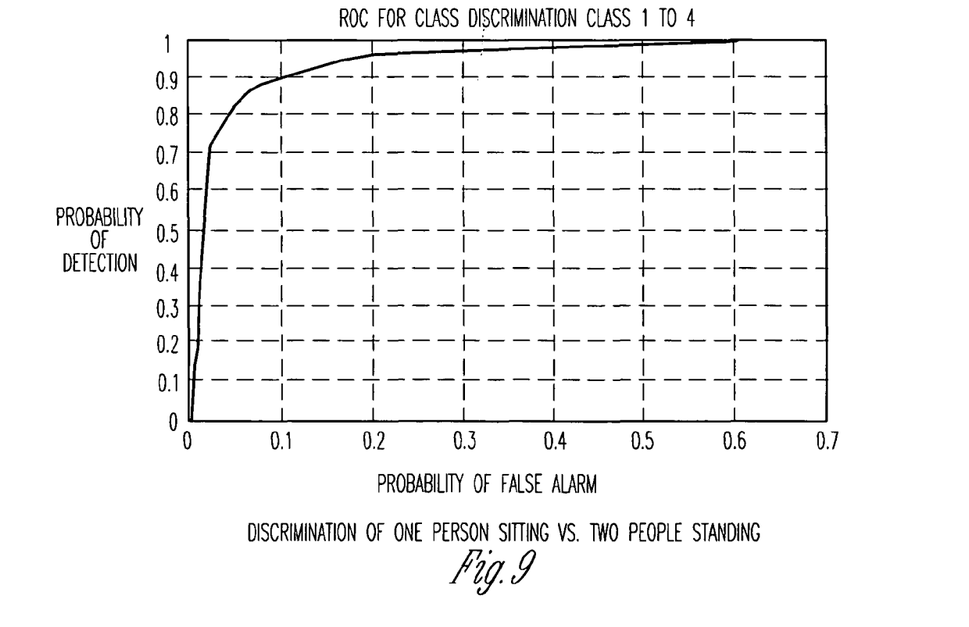
FIG. 9 illustrates discrimination between one person sitting and two persons standing performed by a biometric radar system in accordance with embodiments of the present invention.

FIG. 9 illustrates discrimination between one person sitting and two persons standing performed by a biometric radar system in accordance with embodiments of the present invention. As can be seen, one person sitting can also be easily discriminated from two people sitting using radar system 100 (FIG. 1).

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A biometric radar comprising:
    phase adjusters to phase adjust a sequence of radar return signals received through two or more receive antennas, the phase-adjusting removing at least some phase noise due to stationary objects;

a signal processor to segment the phase adjusted radar return signals into a plurality of multi-resolutional Doppler components, each multi-resolutional Doppler component being associated with one of a plurality of biometric features; and a non-linear convolutional neural network to combine and weight the segmented radar returns for each biometric feature to generate weighted classifications for a feature extraction process.

2. The radar system of claim 1 wherein each multi-resolutional Doppler component has a frequency structure associated with one of the biometric features, wherein the biometric features associated with humans and comprise heartbeat, breathing, postural sway and gait.

3. The radar system of claim 2 wherein the neural network processes the segmented and phase-adjusted radar return signals to identify a person from a non-person.

4. The radar system of claim 2 wherein the weighted classifications correspond to one or more positional states of a person including a person walking, a person talking, a person standing, a person sitting, a person sleeping, multiple persons, and a person with an object.

5. The radar system of claim 4 wherein the signal processor further segments the phase-adjusted radar return signals into non-biometric features including static objects and clutter.

6. The radar system of claim 5 further comprising phase processors to lock a radar range gate on static objects and place other radar range gates on target objects to help force coherency.

7. The radar system of claim 6 wherein the signal processor integrates the radar return signals over differing coherency times for the different of the multi-resolutional Doppler components of the plurality, and wherein some of the multi-resolutional Doppler components have longer coherency times than other multi-resolutional Doppler components.

8. The radar system of claim 7 wherein the signal processor integrates the multi-resolutional Doppler components associated with the biometric features of heartbeat and breathing for longer coherency times, and wherein the signal processor integrates the multi-resolutional Doppler components associated with the biometric features of postural sway and gait for shorter coherency times.

9. The radar system of claim 7 wherein the non-linear convolutional neural network is trained with a back-propagation learning process to set weights of the biometric features associated with the positional states.

10. The radar system of claim 9 wherein the neural network comprises a combination of a plurality of non-linear convolutional networks, each of the non-linear convolutional networks being associated with one of the weighted classifications, wherein the signal processor directs the multi-resolution Doppler components associated with particular biometric features to one or more of the convolutional networks of the plurality based on the classifications, and wherein the combination of the convolutional networks performs a multi-layer non-linear convolutional process on the directed multi-resolutional Doppler components using non-linear filters to generate weighted positional states for a human target.

11. The radar system of claim 10 wherein the plurality of non-linear convolutional networks are configured to operate in parallel and are weighted to the quantity and quality of information in the multi-resolutional Doppler components.

12. The radar system of claim 10 wherein the neural network is further trained with the back-propagation learning process to set weights of biometric features associated with a particular individual.

13. The radar system of claim 10 further comprising an antenna structure having a transmit antenna and two or more receive antennas, the two or more receive antennas to receive the sequence of radar return signals in azimuth and elevation.

14. The radar system of claim 13 further comprising radar transmitter circuitry to transmit a series of short pulses stepped in frequency and corresponding to the received sequence of radar return signals.

15. The radar system of claim 4 further comprising a feature extractor to perform the feature extraction process, the feature extraction process to generate an output selected from one of the positional states.

16. A method for identifying a person and a person's positional state comprising:

phase adjusting a sequence of radar return signals received through two or more receive antennas, the phase-adjusting removing at least some phase noise due to stationary objects;

segmenting the phase adjusted radar return signals into a plurality of multi-resolutional Doppler components, each multi-resolutional Doppler component being associated with one of a plurality of biometric features; and combining and weighting the segmented radar returns for each biometric feature in a non-linear convolutional neural network to generate weighted classifications for a feature extraction process.

17. The method of claim 16 wherein each multi-resolutional Doppler component has a frequency structure associated with one of the biometric features, wherein the biometric features associated with humans and comprise heartbeat, breathing, postural sway and gait.

18. The method of claim 17 wherein the neural network processes the segmented and phase-adjusted radar return signals to identify a person from a non-person.

19. The method of claim 17 wherein the weighted classifications correspond to one or more positional states of a person including a person walking, a person talking, a person standing, a person sitting, a person sleeping, multiple persons, and a person with an object.

20. The method of claim 19 further comprising segmenting the phase-adjusted radar return signals into non-biometric features including static objects and clutter.

21. The method of claim 20 further comprising locking a radar range gate on static objects and placing other radar range gates on target objects to help force coherency.

22. The method of claim 21 further comprising integrating the radar return signals over differing coherency times for the different of the multi-resolutional Doppler components of the plurality, and wherein some of the multi-resolutional Doppler components are integrated over longer coherency times than other multi-resolutional Doppler components.

23. The method of claim 22 wherein the multi-resolutional Doppler components associated with the biometric features of heartbeat and breathing are integrated for longer coherency times, and wherein the multi-resolutional Doppler components associated with the biometric features of postural sway and gait are integrated for shorter coherency times.

24. The method of claim 22 further comprising training the non-linear convolutional neural network with a back-propagation learning process to set weights of the biometric features associated with the positional states.

25. The method of claim 24 wherein the neural network comprises a combination of a plurality of non-linear convolutional networks, each of the non-linear convolutional networks being associated with one of the weighted classifications, wherein the method further comprises:

directing the multi-resolution Doppler components associated with particular biometric features to one or more of the convolutional networks of the plurality based on the classifications; and performing, by the combination of the convolutional networks, a multi-layer non-linear convolutional process on the directed multi-resolutional Doppler components using non-linear filters to generate weighted positional states for a human target.

26. The method of claim 25 further comprising:

configuring the plurality of non-linear convolutional networks to operate in parallel; and weighting the networks to the quantity and quality of information in the multi-resolutional Doppler components.

27. The method of claim 25 further comprising training the neural network with the back-propagation learning process to set weights of biometric features associated with a particular individual.

28. The method of claim 25 further comprising:

transmitting a series of short pulses stepped in frequency and corresponding to the received sequence of radar return signals; and receiving, with two or more receive antennas, the sequence of radar return signals in azimuth and elevation.

29. The method of claim 19 further comprising performing the feature extraction process to generate an output selected from one of the positional states.

30. A radar system comprising:

transmitter circuitry to transmit a series of short pulses stepped in frequency;

phase adjusters to phase adjust a sequence of radar return signals received through two or more receive antennas, the phase-adjusting removing at least some phase noise due to stationary objects, the transmitted series of short pulses corresponding to the received sequence of radar return signals;

a signal processor to segment the phase adjusted radar return signals into a plurality of multi-resolutional Doppler components, each multi-resolutional Doppler component being associated with one of a plurality of biometric features; and a non-linear convolutional neural network to combine and weight the segmented radar returns for each biometric feature to generate weighted classifications for a feature extraction process, wherein each multi-resolutional Doppler component has a frequency structure associated with one of the biometric features, and wherein the biometric features associated with humans and comprise heartbeat, breathing, postural sway and gait.

31. The radar system of claim 30 wherein the weighted classifications correspond to one or more positional states of a person including a person walking, a person talking, a person standing, a person sitting, a person sleeping, multiple persons, and a person with an object, and wherein the signal processor further segments the phase-adjusted radar return signals into non-biometric features including static objects and clutter.

32. The radar system of claim 31 further comprising:

phase processors to lock a radar range gate on static objects and place other radar range gates on target objects to help force coherency; and a feature extractor to perform the feature extraction process, the feature extraction process to generate an output selected from one of the positional states, wherein the signal processor integrates the radar return signals over differing coherency times for the different of the multi-resolutional Doppler components of the plurality, and wherein some of the multi-resolutional Doppler components have longer coherency times than other multi-resolutional Doppler components.

33. The radar system of claim 32 wherein the neural network comprises a combination of a plurality of non-linear convolutional networks, each of the non-linear convolutional networks being associated with one of the weighted classifications, wherein the signal processor directs the multi-resolution Doppler components associated with particular biometric features to one or more of the convolutional networks of the plurality based on the classifications, and wherein the combination of the convolutional networks performs a multi-layer non-linear convolutional process on the directed multi-resolutional Doppler components using non-linear filters to generate weighted positional states for a human target.

* * * * *